United States Patent
Singh et al.

(10) Patent No.: US 9,979,682 B2
(45) Date of Patent: May 22, 2018

(54) COMMAND PROPAGATION OPTIMIZATION

(71) Applicant: Microsoft Technology Licensing, LLC, Redmond, WA (US)

(72) Inventors: Jaskaran Singh, Redmond, WA (US); Szymon Madejczyk, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 14/842,013

(22) Filed: Sep. 1, 2015

(65) Prior Publication Data

US 2017/0063742 A1    Mar. 2, 2017

(51) Int. Cl.
  *G06F 15/16* (2006.01)
  *H04L 12/58* (2006.01)
  *G06Q 10/10* (2012.01)
(52) U.S. Cl.
  CPC ......... *H04L 51/046* (2013.01); *G06Q 10/107* (2013.01); *G06Q 10/1095* (2013.01); *H04L 51/36* (2013.01)
(58) Field of Classification Search
  CPC ..... H04L 51/046; H04L 51/36; G06Q 10/107; G06Q 10/1095
  USPC ....................................................... 709/206
  See application file for complete search history.

(56) References Cited

U.S. PATENT DOCUMENTS

| | | | |
|---|---|---|---|
| 4,653,048 A | 3/1987 | Anderson et al. | |
| 5,197,000 A | 3/1993 | Vincent | |
| 5,813,013 A | 9/1998 | Shakib et al. | |
| 5,905,863 A | 5/1999 | Knowles et al. | |
| 6,272,074 B1 | 8/2001 | Winner | |
| 7,016,909 B2 | 3/2006 | Chan et al. | |
| 7,108,173 B1 | 9/2006 | Wang et al. | |
| 7,343,312 B2 | 3/2008 | Capek et al. | |
| 7,370,282 B2 | 5/2008 | Cary | |
| 7,490,089 B1 | 2/2009 | Georgiev | |
| 7,499,942 B2 | 3/2009 | Simison et al. | |

(Continued)

FOREIGN PATENT DOCUMENTS

WO    WO9922324    5/1999

OTHER PUBLICATIONS

U.S. Appl. No. 14/842,036, filed Sep. 1, 2015, Singh et al.

(Continued)

*Primary Examiner* — Wing F Chan
*Assistant Examiner* — Joseph Maniwang
(74) *Attorney, Agent, or Firm* — Workman Nydegger (57) ABSTRACT

Providing series level updates for a series. A method includes identifying a master message. The master message is a series level message that includes a plurality of default properties for an ordered series. An ordered series of instance messages related to the series level message is identified. For each instance message in the ordered series of instance messages, one or more properties are identified that are not yet defined with default property values from the master message and that have not been defined as valid exceptions to the default properties from the master message. A default property value from a corresponding property of the master message is propagated to each of the identified properties. The ordered series is propagated to one or more legacy clients that are unable to consume certain series level messages by propagating the ordered series of instance messages with the updated property values.

20 Claims, 7 Drawing Sheets

(56) References Cited

U.S. PATENT DOCUMENTS

| | | | |
|---|---|---|---|
| 7,743,098 | B2 | 6/2010 | Anglin et al. |
| 7,818,377 | B2 | 10/2010 | Whitney |
| 7,865,872 | B2 | 1/2011 | Chamieh et al. |
| 8,495,656 | B2 | 7/2013 | Johnson et al. |
| 8,577,959 | B2 | 11/2013 | Pandey et al. |
| 8,612,876 | B2 | 12/2013 | Barnett et al. |
| 8,838,461 | B2 | 9/2014 | Beebe et al. |
| 8,850,330 | B2 | 9/2014 | Coppinger et al. |
| 8,924,269 | B2 | 12/2014 | Seubert et al. |
| 2003/0154116 | A1 | 8/2003 | Lofton |
| 2003/0225732 | A1 | 12/2003 | Chan et al. |
| 2003/0233265 | A1 | 12/2003 | Lee et al. |
| 2005/0192857 | A1 | 9/2005 | Levine |
| 2005/0222971 | A1 | 10/2005 | Cary |
| 2006/0031311 | A1 | 2/2006 | Whitney et al. |
| 2006/0200374 | A1 | 9/2006 | Nelken |
| 2007/0005409 | A1 | 1/2007 | Boss et al. |
| 2007/0079260 | A1 | 4/2007 | Bhogal et al. |
| 2007/0150503 | A1 | 6/2007 | Simison et al. |
| 2008/0114636 | A1 | 5/2008 | Nellutla |
| 2008/0147469 | A1 | 6/2008 | Murillo et al. |
| 2008/0168146 | A1 | 7/2008 | Fletcher |
| 2009/0018878 | A1 | 1/2009 | Baron et al. |
| 2009/0248474 | A1 | 10/2009 | Fried et al. |
| 2010/0254389 | A1 | 10/2010 | Singh et al. |
| 2010/0257404 | A1 | 10/2010 | Singh et al. |
| 2010/0262926 | A1 | 10/2010 | Gupta et al. |
| 2011/0015961 | A1 | 1/2011 | Chan |
| 2011/0054976 | A1 | 3/2011 | Adler et al. |
| 2011/0202999 | A1 | 8/2011 | Logan et al. |
| 2011/0225015 | A1 | 9/2011 | Spivack et al. |
| 2011/0247017 | A1 | 10/2011 | Hopkins et al. |
| 2011/0320237 | A1 | 12/2011 | Beaman et al. |
| 2012/0221369 | A1 | 8/2012 | Braatem et al. |
| 2012/0304088 | A1 | 11/2012 | Kho et al. |
| 2013/0055312 | A1 | 2/2013 | Cheng et al. |
| 2013/0067024 | A1 | 3/2013 | Vasters |
| 2013/0144672 | A1 | 6/2013 | Chakra et al. |
| 2013/0246526 | A1 | 9/2013 | Wu et al. |
| 2013/0290058 | A1 | 10/2013 | Gray et al. |
| 2013/0298043 | A1 | 11/2013 | Bailey |
| 2014/0172483 | A1 | 6/2014 | Bellers et al. |
| 2014/0229560 | A1 | 8/2014 | Gray |
| 2014/0278675 | A1 | 9/2014 | DeLuca et al. |
| 2014/0282005 | A1 | 9/2014 | Gutowitz |
| 2014/0310045 | A1 | 10/2014 | Meltzer et al. |
| 2015/0058425 | A1 | 2/2015 | Nathan et al. |
| 2016/0042324 | A1 | 2/2016 | Johnson et al. |
| 2016/0232495 | A1 | 8/2016 | Au et al. |

OTHER PUBLICATIONS

U.S. Appl. No. 14/842,023, filed Sep. 1, 2015, Singh et al.
U.S. Appl. No. 14/842,084, filed Sep. 1, 2015, Singh et al.
U.S. Appl. No. 14/842,097, filed Sep. 1, 2015, Singh et al.
"Recurring Outlook Appointments with an Irregular Pattern", Published on: Mar. 21, 2014. Available at <<http://www.alandaletraining.com/free-tips/recurring-outlook-appointments-with-an-irregular-pattern>>.
"Before your Calendar Appointments are Migrated to the New Exchange Service", Available at least as early as Jul. 8, 2015. Available at <<http://reports.is.ed.ac.uk/areas/itservices/colltools/exseed/help-and-support/migrations/exchange-premigration.pdf>>.
Glover, Ken, "Dealing with Documents for Irregularly Recurring Meetings", Published on: Apr. 13, 2012. Available at <<http://words.usask.ca/sharepointsig/2012/04/13/dealing-with-documents-for-irregularly-recurring-meetings/>>.
"WebEx Meeting Center User Guide", Published on: Aug. 1, 2014. Available at <<http://www.cisco.com/c/dam/en/us/td/docs/collaboration/meeting_center/wx_mc_host_ug.pdf>>.
"Irregular Recurring Meetings", Available at least as early as Jul. 8, 2015. Available at <<http://www.tru.ca/_shared/assets/irregular_recurring_meetings28463.pdf>>.
Hollington, Jesse, "Scheduling Irregularly Recurring Events", Published on: Oct. 19, 2012. Available at <<http://www.ilounge.com/index.php/articles/comments/scheduling-irregularly-recurring-events>>.
Nomura, et al., "A Practical Calendaring System Conforming with Ambiguous Pattern of Recurring Tasks", in Proceedings of 14th International Conference on Network-Based Information Systems, Sep. 7, 2011, pp. 553-558.
Lefkovics, William, "How can I establish recurring meetings with variations in Microsoft Outlook?", Published on: Sep. 29, 2011. Available at <<http://windowsitpro.com/outlook/q-how-can-i-establish-recurring-meetings-variations-microsoft-outlook>>.
Sen, et al., "Satisfying user Preferences while Negotiating Meetings", in International Journal of Human-Computer Studies, vol. 47, Issue 3, Sep. 1997, 34 pages.
International Search Report and Written Opinion issued in PCT Application No. PCT/US2016/049409 dated Nov. 10, 2016.
International Search Report and Written Opinion issued in PCT Application No. PCT/US2016/049347 dated Nov. 30, 2016.
Linthicum "Enterprise Application Integration: Chapter 13: Message Brokers and B2B Application Integration" May 1, 2000, pp. 231-236.
International Search Report and Written Opinion issued in PCT Application No. PCT/US2016/049344 dated Dec. 7, 2016.
Microsoft: "How to: Create a Recurring Series by using EWS in Exchange", Documentation online of Office Dev. Center, Mar. 9, 2015, pp. 1-8.
Microsoft: "How to: Update a Recurring Series by using EWS in Exchange", Documentation online of Office Dev. Center, May 30, 2014, pp. 1-5.
Microsoft: "How to: Update a Recurring Series by using EWS", Documentation online of Office Dev. Center, May 7, 2014, pp. 1-5.
Microsoft: "How to: Access a Recurring Series by using EWS", Documentation online of Office Dev. Center, Mar. 9, 2015, pp. 1-7.
Microsoft: "Recurrence Patterns and EWS Learn About Recurrence Patterns and Recurring Series in Exchange" Documentation Online of Office Dev. Center, Mar. 9, 2015, pp. 1-9.
Microsoft: "Calendars and EWS in Exchange" Documentation Online of Office Dev. Center, Mar. 9, 2015, pp. 1-4.
Smith "Exchange Server 2016 Architecture", Microsoft TechNet, May 5, 2015, pp. 1-8.
International Search Report and Written Opinion issued in PCT/US2016/049348 dated Jan. 24, 2017.
Office Action dated Apr. 17, 2017 cited in U.S. Appl. No. 14/842,036 (Copy Attached).
Office Action dated Apr. 6, 2017 cited in U.S. Appl. No. 14/842,084 (Copy Attached).
Second Written Opinion Issued in PCT Application No. PCT/US2016/049347, dated Mar. 6, 2017, 6 Pages.
"Second Written Opinion Issued in PCT Application No. PCT/US2016/049348", dated May 12, 2017, 7 Pages.
"Recurrence Patterns and EWS", Published on: Sep. 3, 2014, Available at: https://msdn.microsoft.com/en-us/library/office/dn727655(v=exchg.150).aspx.
"Irregular Recurring Appointments and Meetings", Published on: Jul. 7, 2011, Available at: http://www.msoutlook.info/question/549.
"Create a Repeating Event", Published on: Apr. 25, 2013, Available at: https://support.google.com/calendar/answer/37115?hl=en.
International Search Report and Written Opinion issued in PCT Application No. PCT/US2016/049346 dated Oct. 24, 2016.
Borestein et al. "MIME (Multipurpose Internet Mail Extensions) Part One: Mechanisms for Specifying and Describing the Format of Internet Message Bodies" Sep. 1993.
Second Written Opinion Issued in PCT Application No. PCT/US2016/049346 dated Aug. 17, 2017.
Microsoft "Mailbox synchronization and EWS in Exchange", Retrieved From: <<https://msdn.microsoft.com/en-us/library/office/dn440952(v=exchg.150).aspx>>, Mar. 9, 2015, 4 Pages.
Microsoft "Notification subscriptions, mailbox events, and EWS in Exchange", Retrieved From <<https://msdn.microsoft.com/en-us/library/office/dn458791(v=exchg.150).aspx>>, Mar. 9, 2015, 4 Pages.

(56) References Cited

OTHER PUBLICATIONS

"Second Written Opinion Issued in PCT Application No. PCT/US2016/049344", dated Sep. 6, 2017, 13 Pages.
International Preliminary Report on Patentability Issued in PCT Application No. PCT/US2016/049348, dated Oct. 13, 2017, 7 Pages.
"International Preliminary Report on Patentability Issued in PCT Application No. PCT/US2016/049347", dated Sep. 29, 2017, 8 Pages.
U.S. Appl. No. 14/842,023, Oct. 25, 2017, Notice of Allowance.
"International Preliminary Report on Patentability issued in PCT Application No. PCT/US2016/049409," dated Nov. 14, 2017 (Copy Attached).
Office Action dated Jul. 17, 2017 cited in U.S. Appl. No. 14/842,023 (Copy Attached).
Second Written Opinion Issued in PCT Application No. PCT/US2016/049409 dated Jun. 23, 2017.
Agnantis Konstantinos and Refanidis Ioannis, "Activity Ontologies for Intelligent Calendar Application", ACM, 2015, retrievedonline on Sep. 1, 2017, pp. 1-8. Retrieved from the Internet: <URL: http://delivery.acm.Org/10.1145/2810000/2801109/a17-agnantis.pdf?>.
Notice of Allowance dated Sep. 19, 2017 cited in U.S. Appl. No. 14/842,084 (Copy Attached).
Notice of Allowance dated Oct. 2, 2017 cited in U.S. Appl. No. 14/842,036 (Copy Attached).
"International Preliminary Report on Patentability Issued in PCT Application No. PCT/US2016/049344 dated Dec. 4, 2017", (Copy Attached).
"International Preliminary Report on Patentability Issued in PCT Application No. PCT/US2016/049346", Mailed Date: Dec. 12, 2017, 7 pages.
U.S. Appl. No. 14/842,023, dated Dec. 13, 2017, Notice of Allowance.
U.S. Appl. No. 14/842,023, dated Jan. 12, 2018, Notice of Allowance.
U.S. Appl. No. 14/842,036, dated Nov. 30, 2017, Notice of Allowance.
U.S. Appl. No. 14/842,084, dated Dec. 18, 2017, Notice of Allowance.
Office Action issued in U.S. Appl. No. 14/842,097 dated Mar. 13, 2018 (Copy Attached).

|  | Monday | Tuesday | Wednesday | Thursday | Friday |
|---|---|---|---|---|---|
| 10 AM | Metadata for the Series | | | | |
| 11 AM | | | | 212 | |
| 12 PM | Instance | | Instance | | |
| 1 PM | 216-1 | | 216-2 | Instance | |
| 2 PM | | | | 216-3 | |

COMMAND PROPAGATION OPTIMIZATION

BACKGROUND

Background and Relevant Art

Computers and computing systems have affected nearly every aspect of modern living. Computers are generally involved in work, recreation, healthcare, transportation, entertainment, household management, etc.

As computer technology advances, new features may be added to new (referred to herein as modern) versions of existing systems. As these features are added, there may be older (referred to herein as legacy) versions of the existing systems that are not able to natively implement the new features. However users of these legacy versions of systems may wish to take advantage the new features in the modern versions of the systems.

For example, modern versions of scheduling systems (such as the calendar functionality included in Microsoft Exchange Server and Microsoft Outlook client available from Microsoft Corporation of Redmond, Wash.) may include functionality that allows advanced scheduling features, such as the ability to have exceptions for appointments in a series of appointments, modify individual appointments in a series of appointments, add additional appointment instances to a series of appointments, collaborate on appointment details, etc. In some situations a server may have this functionality enabled and modern clients can make use of the functionality while legacy clients and other connected legacy servers are unable to make use of the functionality. This can create difficulties for users of both the modern clients and the legacy clients. In particular, a user at a modern client may utilize some of the functionality of the modern server and expect other users, including users at legacy clients, to be aware of the utilization. For example, a user at a modern client may update an instance of a series of appointments. Other users using modern clients would be made aware of the update, but users on legacy clients may not be made aware of the update, or may be made aware of the update in a way that breaks the series of appointments as a series. Additionally, updating a default value in series of appointments may overwrite any updates for individual instances in a series of appointments. It would be useful to implement systems where modern and legacy clients could both implement new functionality and still be able to interact with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for providing series level updates for a series, to legacy clients that are unable to process certain series level messages, by propagating series level properties across different instance messages in a series of messages and providing the different instance messages to the legacy clients, the method includes identifying a master message. The master message is a series level message that includes a plurality of default properties for an ordered series. An ordered series of instance messages related to the series level message is identified. The ordered series of instance messages includes an instance message for each instance in the ordered series. For each instance message in the ordered series of instance messages, one or more properties are identified that are not yet defined with default property values from the master message and that have not been defined as valid exceptions to the default properties from the master message. A default property value from a corresponding property of the master message is propagated to each of the identified properties. The ordered series is propagated to one or more legacy clients that are unable to consume certain series level messages by propagating the ordered series of instance messages with the updated property values.

This Summary is provided to introduce a selection of concepts in a simplified form that are further described below in the Detailed. Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein may be implemented using a master message and a set of instance messages for a series of messages. The master message stores all of the default values for the series of messages. The instance messages store any exceptions to the default values. It may be desirable to apply the default values to the instance messages for any values that are not exception values. This may be particularly true when a default value is updated and that update needs to be propagated to the instance messages. Thus, embodiments may apply the same operation to a number of distinct items, in this case, messages. In some embodiments, the messages may be calendar items, and the series of messages may be a series of recurring calendar items.

Figure 1A:
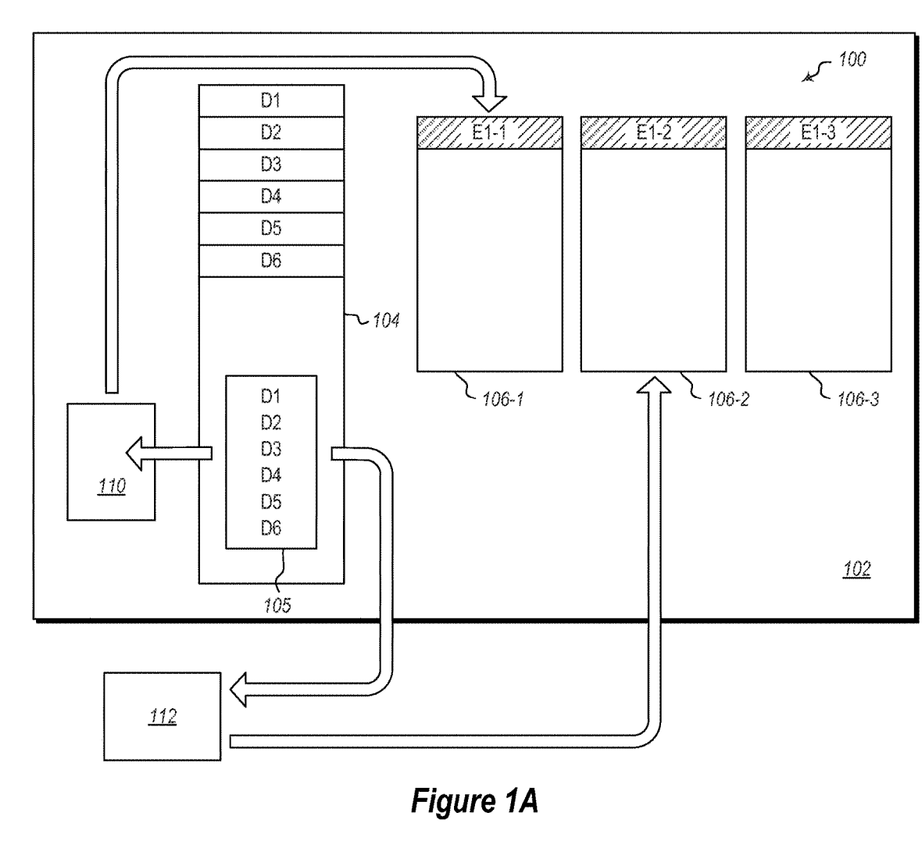
FIG. 1A illustrates a server and system for propagating values from a master message to instance messages.

Referring now to FIG. 1A, an example is illustrated. FIG. 1 illustrates a series 100 of messages. The series 100 of messages includes a master message 104 and a set of instance messages 106-1, 106-2 and 106-3. The master message 104 includes a plurality of default values D1, D2, D3, D4, D5, and D6. In the example where the series 100 of messages are calendar items, these values might include values defining dates, times, meeting attendees, locations, etc.

FIG. 1A further illustrates the instance messages 106-1, 106-2 and 106-3. While three instance messages are shown, it should be appreciated that any appropriate number of messages may be used. These instance messages include exceptions to the default values in the master message 104. For example, instance message 106-1 is shown with an exception value E1-1, instance message 106-2 is shown with an exception value E1-2, and instance message 106-3 is shown with an exception value E1-3. The exception values in the instance messages may modify and/or replace the default values in the master message 104. Thus, for example, D1 may be a date. E1-1, E1-2, and E1-3 may be different dates.

Embodiments may wish to apply any default values from the master message 100 that are not superseded by exception values to the instance messages 106-1, 106-2 and 106-3. Thus, in the illustrated example, the default values D2 through D5 may need to be applied to the instance messages 106-1, 106-2 and 106-3. Various operations may be performed to apply the default values D2 through D5 to the instance messages.

Thus, in this example, the same operation(s) needs to be applied to a number of distinct items, in this example, messages. Embodiments may have a command queue 105 in which the command to perform an operation is logged. In this example shown in FIG. 1A, the command queue 105 is included in the master message 104. Thus, in the example, for non-pattern recurrence embodiments (as discussed in more detail below), there is a command queue 105 on each series master (e.g., master message 104) which is used to store any series level updates. These need to be applied, in the order they appear on the queue, to each instance message 106 to facilitate interoperability with legacy clients. While the examples here illustrate the command queue 105 on each master message 104, in other embodiments, the command queue 105 may be stored in other locations and associated with the master message 104.

In the illustrated example, there are two mechanisms configured to apply update commands from the command queue 105 to the instance messages, namely an in-line tool 110 and a background service 112 which will apply the command. On a series update, a command is queued up by the in-line tool 110 which tries to apply the command to each individual instance message 106. The in-line tool 110 may be, for example, an application programming interface (API) on a server 102. For example, the server 102 may be a calendaring system such as the calendaring system available in Exchange Server available from Microsoft Corporation of Redmond, Wash.

Figure 1B:
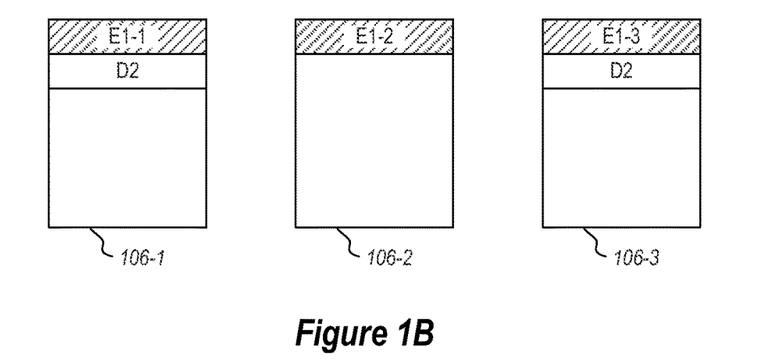
FIG. 1B illustrates instance messages being updated.

A call to the in-line tool 110 may be terminated due to system failure, operating errors, or for some other reason, in between when the call to the in-line tool 110 is made and when updates have been applied to instance messages. However, as noted, embodiments may include a background service 112 which obtains commands from the command queue 105 and applies these commands to the instance messages 106 in concert with the in-line tool 110. As the background service 112 is running independently of the in-line tool 110, there could be a race condition with the inline tool 110. Additionally or alternatively, resources may be wasted when the background service 112 first checks to see if a particular command has already been applied to each instance message 106. To optimize on both of these, embodiments may be configured to have the background service 112 apply commands from the command queue 105 to the instance messages 106-1, 106-2 and 106-3 in reverse order with respect to the order used by the in-line tool 110. For example, if the instance messages 106-1, 106-2 and 106-3 are ordered, e.g. ordered by their start times, then the inline tool is configured to update 106-1, then 106-2, and then 106-3. Contemporaneously, the background service is configured to start with 106-3, then 106-2, and then 106-1. For example, FIG. 1B illustrates an example where the in-line tool 110 applies value D2 to the instance message 106-1 while the background service 112 applies the value D2 to the instance message 106-3.

Figure 1C:
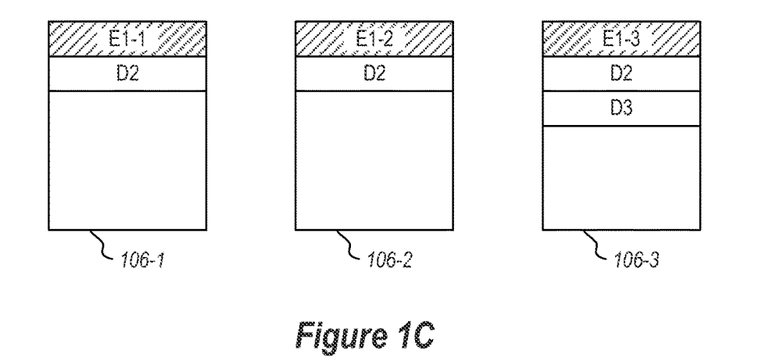
FIG. 1C illustrates instance messages being updated.
Figure 1D:
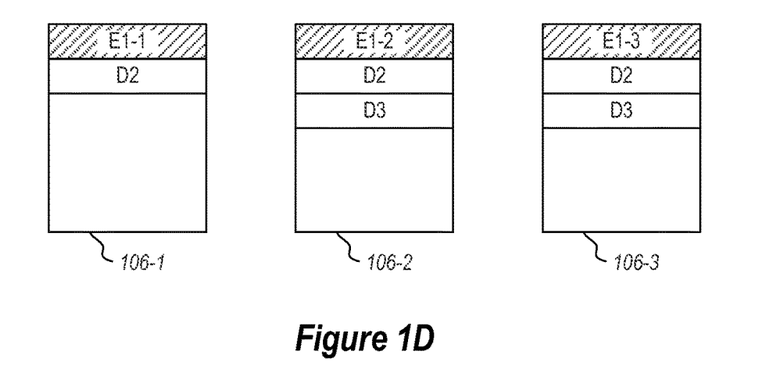
FIG. 1D illustrates instance messages being updated.

FIG. 1C illustrates an example where the in-line tool 110 has stopped applying updates for some reason. For example, perhaps the in-line tool 110 has encountered an error. In this example, the background service 112 applies the value D2 to the instance message 106-2. Since the command for applying the value D2 to the instance messages 106 has completed, the background service 112 starts executing the command(s) for applying the value D3 to the instance messages 106. In FIG. 1C, the value D3 is applied to the instance message 106-3 by the background service 112. FIG. 1D illustrates that the value D3 is then applied to the instance message 106-2 by the background service 112.

Propagation of values from the master message 104 to the instance messages 106-1, 106-2, and 106-3 may be performed in a number of different fashions. For example, in the examples illustrated in FIGS. 1A, 1B, 1C and 1D default values are propagated in a first instance when the instance messages have no pre-existing default values or corresponding exception values. Thus, FIGS. 1A, 1B, 1C and 1D illustrate examples where exception values E1-1, E1-2, and E1-3 exist superseding the default value D1. Other than the exception values E1-1, E1-2, and E1-3, the instance messages 106-1, 106-2, and 106-3 do not include, initially, any of the other default values D2, D3, D4, D5, and D6. FIGS. 1A, 1B, 1C and 1D illustrate initial application of the default values D2, D3, D4, D5, and D6. FIGS. 1A, 1B, 1C and 1D illustrate an example where default values are added one default value at a time to the instance messages.

Figure 2:
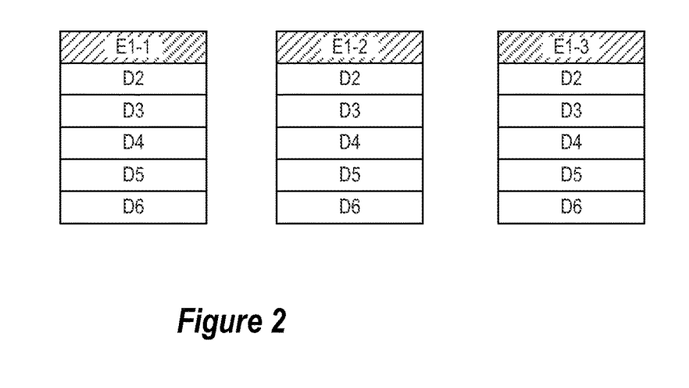
FIG. 2 illustrates instance messages being updated.

Alternatively, as illustrated in FIG. 2, when initially applying default values, embodiments could add all appropriate defaults to an instance message (i.e., default values for which there is not a superseding exception value) and then move to next instance message. In the example illustrated in FIG. 2, the in-line tool 110 applies default values D2, D3, D4, D5, and D6 to the instance message 106-1 while the background service 112 applies the default values D2, D3, D4, D5, and D6 to the instance message 106-3.

In yet an alternative embodiment, the default values D1, D2, D3, D4, D5, and D6 are applied to the instance messages 106-1, 106-2, and 106-3, as appropriate, when those messages are created and exception values E1-1, E1-2, and E1-3 can be applied to instance messages 106-1, 106-2, and 106-3 respectively later. Alternatively, the exception values E1-1, E1-2, and E1-3 can be applied to instance messages 106-1, 106-2, and 106-3 respectively, while the default values D2, D3, D4, D5, and D6 are applied during the creation process of the instance messages 106-1, 106-2, and 106-3.

Figure 3A:
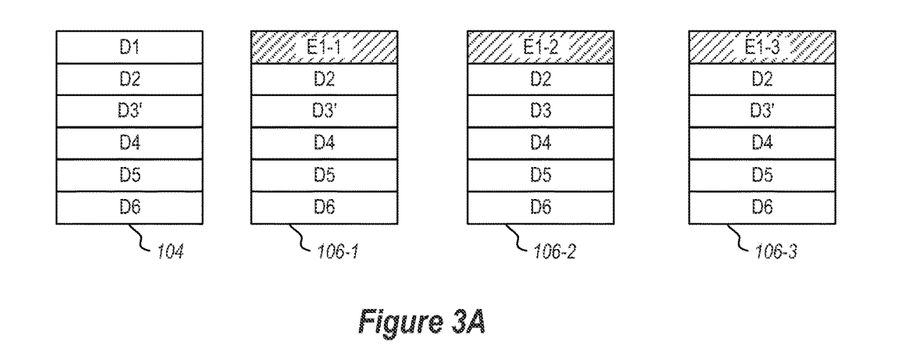
FIG. 3A illustrates instance messages being updated.
Figure 3B:
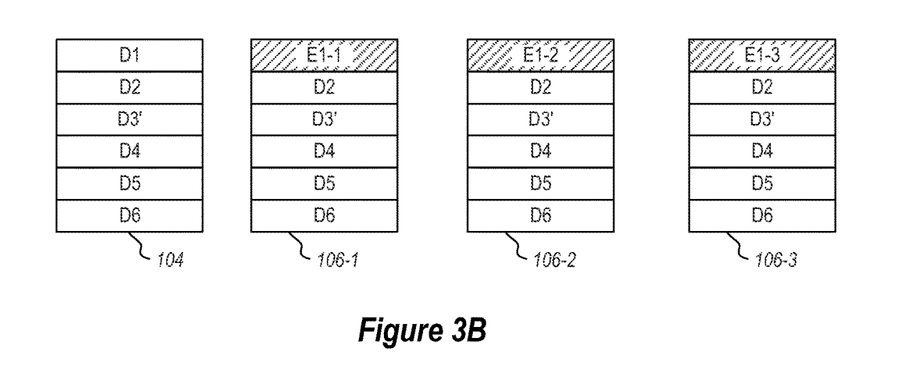
FIG. 3B illustrates instance messages being updated.

Once default values have been applied to the instance messages 106-1, 106-2, and 106-3 there may be a need to update a default value that should be applied to all messages. For example, FIG. 3A illustrates that default value D3 is updated to D3' in the master message 104. This change is propagated to the instance messages in a fashion as illustrated above. For example, in FIG. 3A, the in-line tool 110 (from FIG. 1A) is used to update the instance message 106-1 while the background service 112 is used to update the instance message 106-3. FIG. 3B illustrates completion of updating all instance messages 106-1, 106-2 and 106-3 by using the in-line tool 110 and/or the background service 112.

Notably, however, updating the default value D3 to D3' does not result in an overwrite of the exception values E1-1, E1-2, and E1-3 as would normally occur in some legacy systems.

The following now illustrates additional details related to a framework in which embodiments may be implemented. In particular, the following illustrates an example of a modern system that is configured to natively implement non-pattern recurrence messages but still allow legacy clients to also use such functionality using their legacy mechanisms.

In some embodiments, the messages are email messages. For example, in some embodiments, a string of emails may exist. In some legacy systems, hashtags for a string of emails, or social media "likes" of the string of emails may be able to be added to the entire string. However, to remove a "like" or a hashtag from an individual message in the string, embodiments can create an exception that indicates the removal of the "like" or hashtag. The exception can be propagated as appropriate to an instance message while maintaining other default values.

Embodiments may be implemented in a framework where there is a creation of a series of meetings that does not have a recurrence pattern. Unless explicitly stated, anything that applies to a traditional recurring series applies here as well. For example, an organizer should be able to: add an attendee to all instances; add an attendee only to one instance; cancel the whole series; cancel only one instance in the series; set the location for the whole series; change the location only in one instance; etc.

Conversely, in the illustrated example, operations that are not allowed on a recurring series (like adding an existing meeting to a series) will not be allowed here. One exception to this rule is the ability to have multiple instances on the same day (which is not currently allowed for a recurring series).

Using the functionality set forth herein, legacy clients will be able to see all instances of the series without changing their implementation. However, in the illustrated examples, they will be seen as individual appointments because in some legacy schema, it is not possible to represent such instances as a single appointment.

Figure 4A:
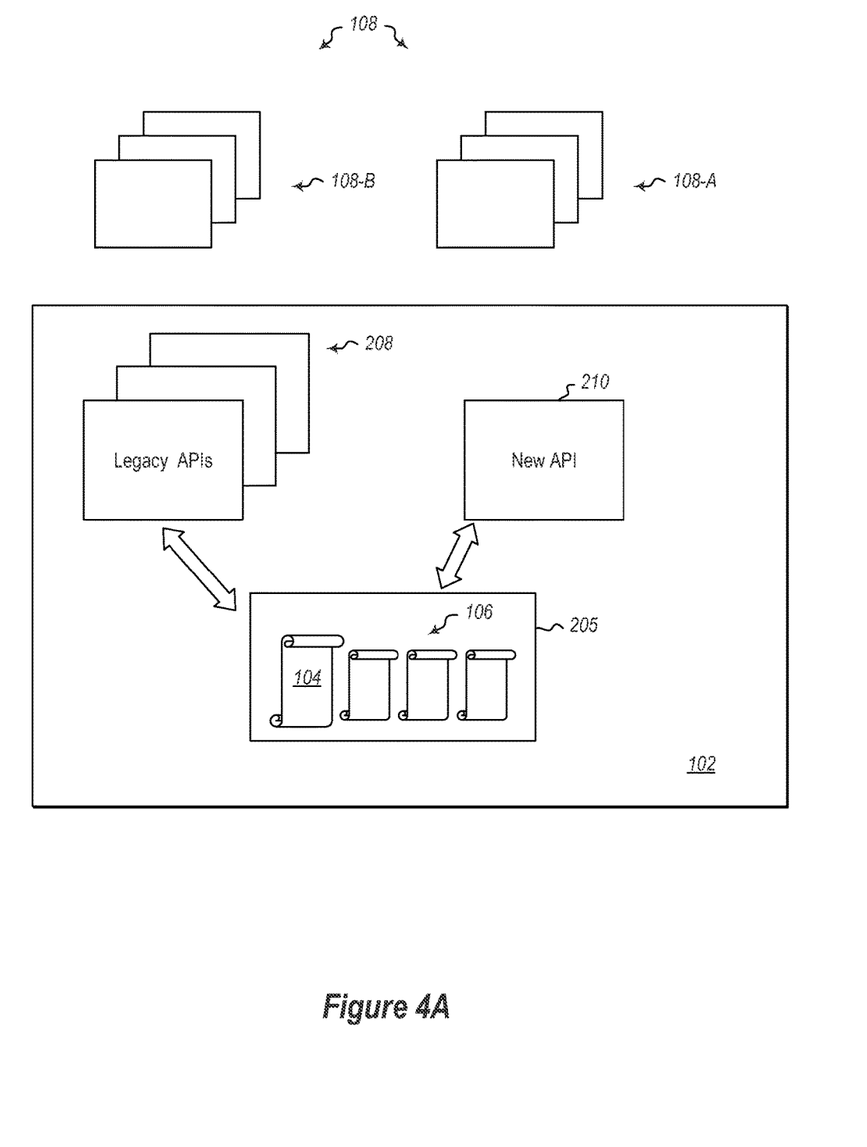
FIG. 4A illustrates a modern server that facilitates legacy clients.

Referring now to FIG. 4A, an example is illustrated which illustrates a single calendar folder 205. Both modern clients 108-A and legacy clients 108-B connect to this folder 205 on the server 102. But for legacy APIs 208 used by legacy clients, the server 102 hide the series master 104. The legacy clients can see the instance messages, where they can get default information and exception information on an event by event basis. Modern clients 108-A, using the new API can see both the series master 104 to obtain default information for the entire series of events and the instance messages 106 to obtain exception information for each event.

Figure 4B:
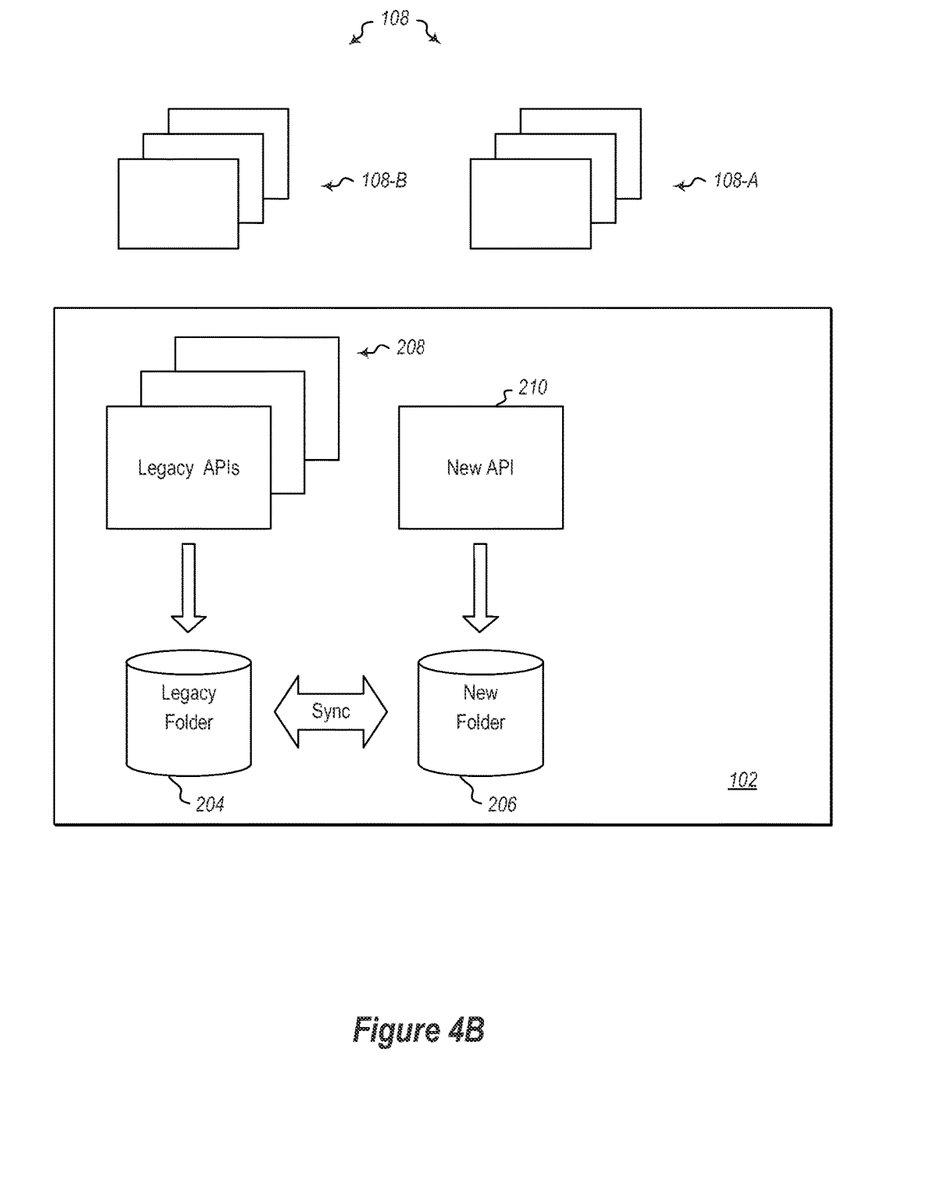
FIG. 4B illustrates a modern server that facilitates legacy clients.

Referring now to FIG. 4B, an alternative example is illustrates which illustrates a server 102 is illustrated with two calendar folders. A first legacy calendar folder 204 for legacy clients using legacy APIs 208 and a second new calendar folder 206 is for clients that use a new API 210.

The legacy calendar folder 204 continues to store items according to a legacy schema in a way that legacy clients can understand the items. For example, for legacy clients that do not understand non-pattern recurrences, these items will be stored as single items (such as the instance messages 106) instead of as part of a non-pattern recurrence series (such as the master message 104). The legacy calendar folder 204 will remain visible to legacy clients 108-B and they will interact with it in the same way that they have previously interacted with the legacy calendar folder 204.

The legacy calendar folder 204 will not be visible to modern clients 108-A, and the modern clients 108-A will not communicate with the legacy calendar folder 204. Instead, the modern clients 108-A will use the new calendar folder 206 with a new schema. This folder is not visible to the legacy clients 108-B (since it will contain items stored in a different way, which would not be understood by legacy protocols). It will only be accessible through the new API 210 and not through legacy APIs 208. Therefore, any details of how data is represented will be completely abstracted from clients. For example, non-pattern recurrences will be stored with a representation that has all the desired semantics and that will be exposed via the new API 210.

A sync mechanism to keep data updated on both folders may be implemented.

The following illustrates details regarding storing a non-pattern recurrence. Previously, a recurring series in a legacy system, such as a legacy Exchange Server from Microsoft Corporation of Redmond, Wash. has a top-level master which has information about the recurrence pattern, exceptions and is also used to represent the first instance of the series.

In contrast, a modern system may include an object (e.g., the master message 104) solely responsible for representing the non-pattern recurrence. It holds the following pieces of data:

The properties that are common to all instances (unless they are exceptions of course);
Information about when the series starts and when the series ends; and
A link to the instances of the non-pattern recurrence.

Figure 5:
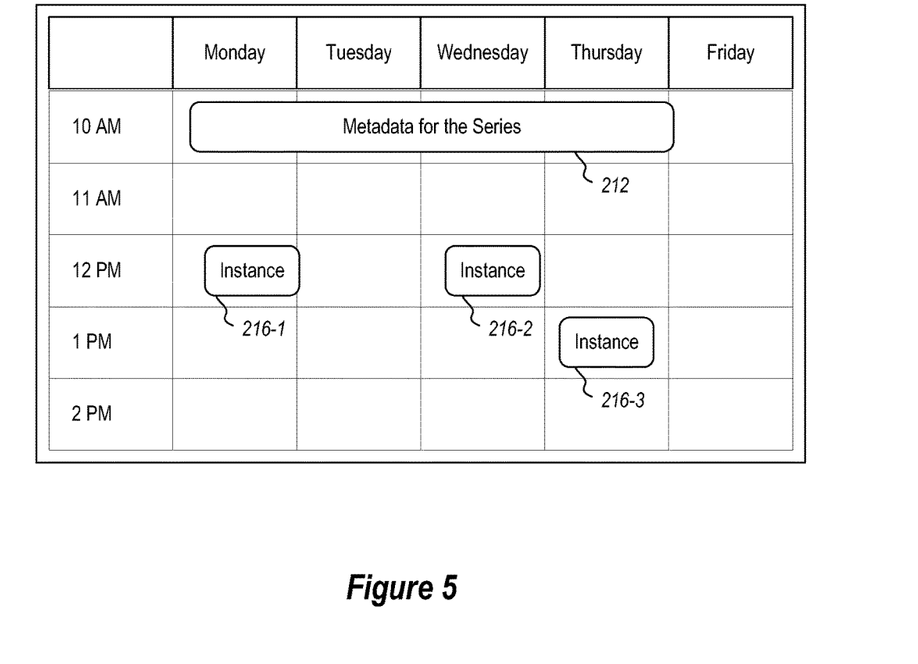
FIG. 5 illustrates a calendar view.

A difference between the non-pattern recurrence master and the "traditional recurring series" master is that this item is just metadata and only meant to be consumed by a modern server, such as a modern Exchange server available from Microsoft Corporation of Redmond, Wash. (and therefore it isn't visible to clients, modern or legacy). For example, FIG. 5 illustrates a representation of a non-pattern recurrence with instances 216-1, 216-2, and 216-3 on Monday, Wednesday and Thursday respectively. Only these items are visible to client. In some embodiments, during a calendar view embodiments internally query for both instance messages 106 and master messages 104 and then merge data from the master message 106 with instance data to get the latest state of the instance (in case background propagation has not yet caught up). At this point only instances are returned from calendar view API call.

Note that the item 212 holding the metadata begins on the same day of the first instance and ends at the last day. This allows for a more efficient query when obtaining a calendar view.

On legacy systems, when a client requests a view, two queries are made to the server 102: one for single and one for recurring items. Single item retrieval is simple: the legacy system can simply request the items that are in the desired window based on their start and end dates. When recurring items are in the picture, however, the server 102 has to examine the entire calendar and filter items in memory. This is because data for the series master also doubles as the first item—and therefore may be outside of the query window.

In contrast, in the non-pattern recurrence model, this is resolved by having the data related to the start and end of the series in the item 212 that represents the series. Since it stretches and shrinks with the instances, it is always in the same window as the instances 216-1, 216-2 and 216-3. This detail allows modern systems to have one single query and have every object of interest returned by it with no need to filter anything in memory.

As explained above, in one alternative embodiment, there are two calendar folders (i.e., a legacy calendar folder 204 and a new calendar folder 206), accessed by different clients (i.e., legacy clients 108-B and modern clients 108-A respectively). The two calendar folders have the same data (but represented in different ways as appropriate for the different clients).

Each time a modern client writes to the new calendar folder 206, an equivalent operation is executed against the legacy calendar folder 204 (and vice-versa). As each folder has a different data model, an operation cannot be simply replayed. Instead, there is a translation into equivalent operations.

For instance, assume that, in the new model, exceptions of a recurring series are treated like top-level partial items (like in non-pattern recurrences) and that a legacy API (from among the legacy APIs 208) is creating an exception.

Conversely, if a new API 210 (which operates against the new folder 206) had created the partial item for the recurring series exception, synchronization operations would have to update the corresponding item on the legacy folder by creating an attachment.

Thus, after each create/update/delete operation, embodiments will take the object as a whole and fully update the equivalent object on the other folder.

Instances of non-pattern recurrences are full items and contain all data required for them to be displayed. This includes series information that will be used only by the modern clients 108-A and all the properties expected by legacy clients 108-B.

To guarantee the backwards compatibility, data that would be only in the master message 104 is propagated to all the instance messages 106 as illustrated above.

Creating or modifying a non-pattern recurrence as a series is done through the new API 210. In this scenario, embodiments are aware of series versus exceptions and perform bulk updates whenever appropriated. There will be a master item, which will only be understood by the new API. MAPI clients will not see it at all.

Thus, for backwards compatibility, each instance of a series will have all the properties necessary to display the item as a single item. Changes to the series as a whole (like changing the subject for all instances) will be written against the master message. Embodiments will attempt to update the other instances inline with the save. Updates that cannot be performed online (either because of failures, because there are too many instances, or for other reasons) will be done in the background process.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
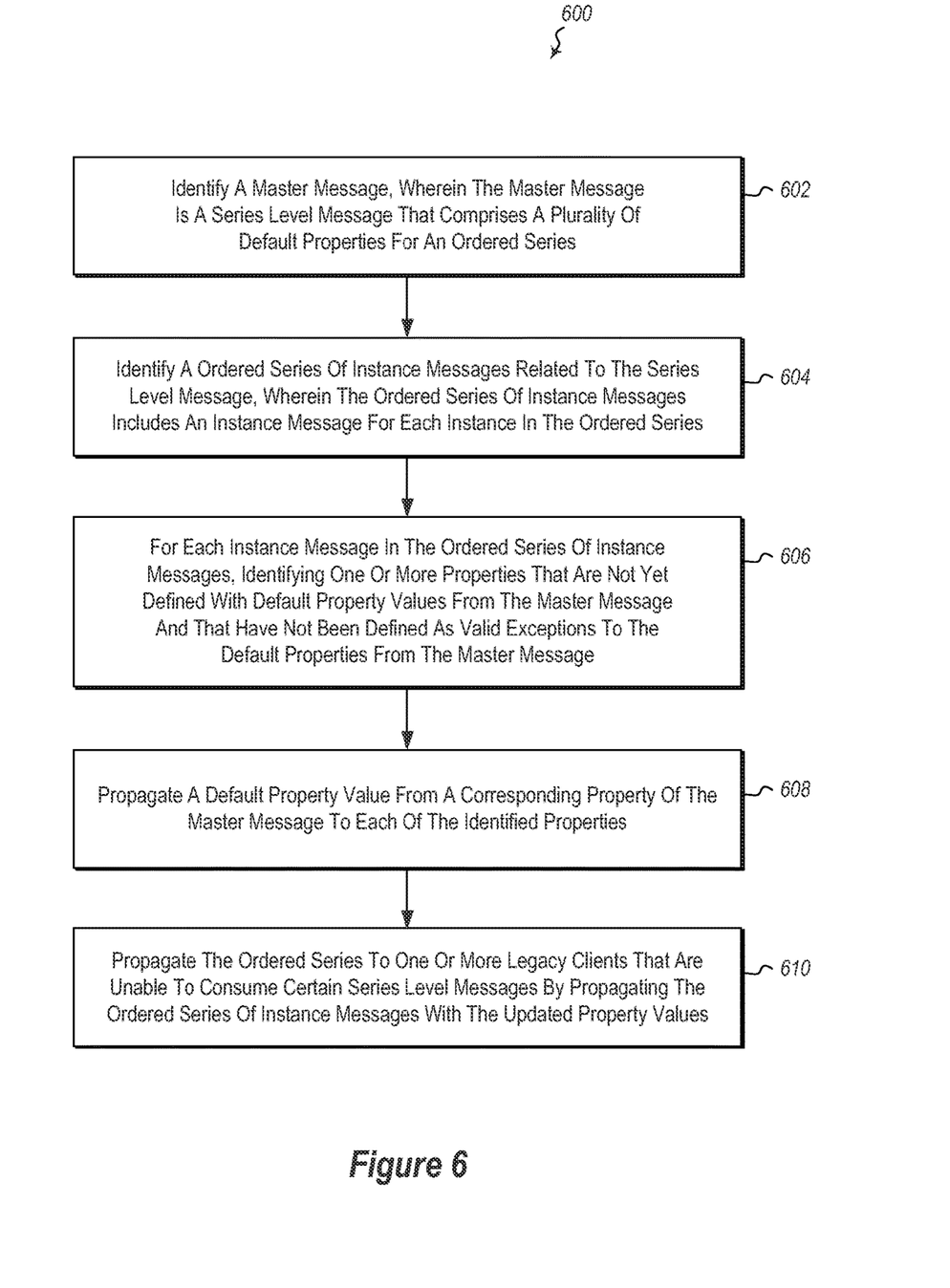
FIG. 6 illustrates a method for providing series level updates for a series.

Referring now to FIG. 6, a method 600 is illustrated. The method 600 may be practiced in a computing environment and includes acts for providing series level updates for a series, to legacy clients that are unable to process certain series level messages, by propagating series level properties across different instance messages in a series of messages, such as calendar items, and providing the different instance messages to the legacy clients. The method 600 includes identifying a master message, wherein the master message is a series level message that comprises a plurality of default properties for an ordered series (act 602).

The method 600 further includes identifying an ordered series of instance messages related to the series level message, wherein the ordered series of instance messages includes an instance message for each instance in the ordered series (act 604).

The method 600 further includes for each instance message in the ordered series of instance messages, identifying one or more properties that are not yet defined with default property values from the master message and that have not been defined as valid exceptions to the default properties from the master message (act 606).

The method 600 further includes propagating a default properly value from a corresponding property of the master message to each of the identified properties (act 608).

The method 600 further includes propagating the ordered series to one or more legacy clients that are unable to consume certain series level messages by propagating the ordered series of instance messages with the updated property values (act 610).

The method 600 may be practiced where the series is a series of calendar items ordered temporally, and wherein the ordered series of instance messages are propagated to legacy clients that are unable to handle non-pattern recurrences of calendar items.

The method 600 may be practiced where the messages are email messages. For example, in some embodiments, a string of emails may exist. In some legacy systems, hashtags for a string of emails, or social media "likes" of the string of emails may be able to be added. However, to remove a "like" or a hashtag from an individual message in the string, embodiments can create an exception that indicates the removal of the "like" or hashtag. The exception can be propagated as appropriate to an instance message while maintaining other default values.

The method 600 may be practiced where a default property value from a corresponding property of the master message to each of the identified properties is performed by using functionality of an inline API of a system configured to allow a user to update series messages.

The method 600 may be practiced where propagating a default property value from a corresponding property of the master message to each of the identified properties is performed by using a background agent separate from a system configured to allow user updates to series messages.

The method 600 may be practiced where propagating a default property value from a corresponding property of the master message to each of the identified properties is performed by using two different entities with one entity propagating default property values starting at a first ordered instance message in the ordered series of instance messages and proceeding towards a last ordered instance message in the ordered series of instance messages and the other entity starting at the last ordered instance message in the ordered series of instance messages and proceeding towards the first ordered instance message in the ordered series of instance messages. In such embodiments, one of the entities is an inline API of a system configured to allow a user to update series messages and the other entity is a background agent separate from a system configured to allow user updates to series messages. This can provide for faster updates and provide redundancy.

The method 600 may be practiced where the messages are email messages conveying a calendaring message.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable (Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for providing series level updates for an ordered series of instance messages, the system comprising:
    storage configured to store a master message, wherein the master message is a series level message that comprises a plurality of default properties for the ordered series of instance messages;
    storage configured to store the ordered series of instance messages related to the series level message, wherein the ordered series of instance messages includes an instance message for each instance in the ordered series of instance messages;

one or more propagation entities configured to:
for each instance message in the ordered series of instance messages, identify one or more properties that are not yet defined with default property values from the master message and that have not been defined as valid exceptions to the default properties from the master message; and
updating property values of the ordered series of instance messages by propagating a default property value from a corresponding property of the master message to each of the identified properties; and
wherein the system is configured to propagate the ordered series of instance messages to one or more legacy clients that are unable to consume a determined type of series level messages.

2. The system of claim 1, wherein the ordered series is a series of calendar items ordered temporally, and wherein the ordered series of instance messages are propagated to legacy clients that are unable to handle non-pattern recurrences of calendar items.

3. The system of claim 1, wherein the instance messages are email messages.

4. The system of claim 1, wherein the one or more propagation entities comprises an inline API of the system configured to allow a user to update series messages.

5. The system of claim 1, wherein the one or more propagation entities comprises a background agent configured to propagate default property value from a corresponding property of the master message to each of the identified properties.

6. The system of claim 1, wherein the one or more propagation entities comprises two different entities with one entity propagating default property values starting at a first ordered instance message in the ordered series of instance messages and proceeding towards a last ordered instance message in the ordered series of instance messages and the other entity starting at the last ordered instance message in the ordered series of instance messages and proceeding towards the first ordered instance message in the ordered series of instance messages.

7. The system of claim 6, wherein one of the two different entities is an inline API of a system configured to allow a user to update series messages and the other entity is a background agent.

8. The system of claim 1, wherein the instance messages are email messages conveying a calendaring message.

9. In a computing environment, a method of providing series level updates for an ordered series of instance messages to legacy clients that are unable to process a determined type of series level messages by propagating series level properties across the instance messages in the series of instance messages and providing the instance messages to the legacy clients, the method comprising:
identifying a master message, wherein the master message is a series level message that comprises a plurality of default properties for the ordered series of instance messages;
identifying the ordered series of instance messages related to the series level message, wherein the ordered series of instance messages includes an instance message for each instance in the ordered series of instance messages;
for each instance message in the ordered series of instance messages, identifying one or more properties that are not yet defined with default property values from the master message and that have not been defined as valid exceptions to the default properties from the master message;
updating property values of the ordered series of instance messages by propagating a default property value from a corresponding property of the master message to each of the identified properties; and
propagating the ordered series of instance messages to one or more legacy clients that are unable to consume a first determined type of series level messages.

10. The method of claim 9, wherein the series is a series of calendar items ordered temporally, and wherein the ordered series of instance messages are propagated to legacy clients that are unable to handle non-pattern recurrences of calendar items.

11. The method of claim 9, wherein the instance messages are email messages.

12. The method of claim 9, wherein propagating the default property value is performed by using functionality of an inline API of a system configured to allow a user to update series messages.

13. The method of claim 9, wherein propagating the default property value is performed by using a background agent separate from a system configured to allow user updates to series messages.

14. The method of claim 9, wherein propagating the default property value is performed by using a two different entities with one entity propagating default property values starting at a first ordered instance message in the ordered series of instance messages and proceeding towards a last ordered instance message in the ordered series of instance messages and the other entity starting at the last ordered instance message in the ordered series of instance messages and proceeding towards the first ordered instance message in the ordered series of instance messages.

15. The method of claim 14, wherein one of the two different entities is an inline API of a system configured to allow a user to update series messages and the other entity is a background agent separate from a system configured to allow user updates to series messages.

16. The method of claim 9, wherein the instance messages are email messages conveying a calendaring message.

17. A system for providing series level updates for an ordered series of instance messages, the system comprising:
one or more hardware processors; and
one or more computer-readable hardware storage media, wherein the one or more computer-readable hardware storage media comprise computer-executable instructions that when executed by at least one of the one or more processors cause at least one of the one or more processors to perform the following:
identifying a master message, wherein the master message is a series level message that comprises a plurality of default properties for the ordered series of instance messages;
identifying the ordered series of instance messages related to the series level message, wherein the ordered series of instance messages includes an instance message for each instance in the ordered series of instance messages;
for each instance message in the ordered series of instance messages, identifying one or more properties that are not yet defined with default property values from the master message and that have not been defined as valid exceptions to the default properties from the master message;

updating property values of the ordered series of instance messages by propagating a default property value from a corresponding property of the master message to each of the identified properties; and propagating the ordered series of instance messages to one or more legacy clients that are unable to consume a first determined type of series level messages.

18. The system of claim 17, wherein propagating the default property value is performed by using functionality of an inline API of a system configured to allow a user to update series messages.

19. The system of claim 17, wherein the system is configured such that propagating a default property value from a corresponding property of the master message to each of the identified properties is configured to be performed by using a background agent separate from a system configured to allow user updates to series messages.

20. The system of claim 17, wherein the system is configured such that propagating a default property value from a corresponding property of the master message to each of the identified properties is configured to be performed by using two different entities with one entity propagating default property values starting at a first ordered instance message in the ordered series of instance messages and proceeding towards a last ordered instance message in the ordered series of instance messages and the other entity starting at the last ordered instance message in the ordered series of instance messages and proceeding towards the first ordered instance message in the ordered series of instance messages.

* * * * *